US012801449B2

(12) United States Patent
Lord et al.

(10) Patent No.: US 12,801,449 B2
(45) Date of Patent: Nov. 17, 2026

(54) PROTOCOL INSPECTION FOR IMPACT CONTROL ON RESOURCE ALLOCATION IN ELECTRONIC ACCOUNTS

(71) Applicant: ADP, Inc., Roseland, NJ (US)

(72) Inventors: James A. Lord, Randolph, NJ (US); Rahim Merchant, Edison, NJ (US); Sanket B. Purani, Chatham, NJ (US)

(73) Assignee: ADP, Inc., Roseland, NJ (US)

( * ) Notice: Subject to any disclaimer, the term of this patent is extended or adjusted under 35 U.S.C. 154(b) by 291 days.

(21) Appl. No.: 18/777,249

(22) Filed: Jul. 18, 2024

(65) Prior Publication Data

US 2025/0036476 A1 Jan. 30, 2025

Related U.S. Application Data

(60) Provisional application No. 63/515,524, filed on Jul. 25, 2023.

(51) Int. Cl.
*G06F 9/50* (2006.01)

(52) U.S. Cl.
CPC .................................. *G06F 9/5055* (2013.01)

(58) Field of Classification Search
None
See application file for complete search history.

(56) References Cited

U.S. PATENT DOCUMENTS

| | | | | |
|---|---|---|---|---|
| 7,260,826 | B2 * | 8/2007 | Zhang | H04L 47/762 375/240.03 |
| 8,095,162 | B2 * | 1/2012 | Karaoguz | H04W 72/0453 375/354 |
| 10,521,778 | B2 * | 12/2019 | Bull | G06Q 20/10 |
| 10,770,181 | B2 * | 9/2020 | Bull | G06Q 10/10 |
| 10,778,606 | B2 * | 9/2020 | Li | H04L 47/82 |
| 11,170,445 | B2 * | 11/2021 | Irwin | G06Q 10/10 |
| 11,205,156 | B2 * | 12/2021 | Kaidi | G06Q 10/107 |

* cited by examiner

*Primary Examiner* — Van H Nguyen
(74) *Attorney, Agent, or Firm* — Foley & Lardner LLP

(57) ABSTRACT

Protocol inspection for impact control on resource allocation in electronic accounts can include system that detects, based on historical performance of protocols to control resource allocation of applications, an event of a first account of a client on a first application. The system can determine that the event has an impact on resource allocation controlled by a protocol of a second electronic account on a second application. The system can generate, responsive to the detection, a data structure that includes data corresponding to the client and an instruction to cause an adjustment to the protocol. The system can transmit the data structure to the second application to control the impact via the adjustment to the protocol. The system can execute the protocol of the second electronic account to control resource allocation in accordance with the adjustment.

18 Claims, 6 Drawing Sheets

PROTOCOL INSPECTION FOR IMPACT CONTROL ON RESOURCE ALLOCATION IN ELECTRONIC ACCOUNTS

CROSS-REFERENCE TO RELATED PATENT APPLICATIONS

This application claims the benefit of priority under 35 U.S.C. § 119 to U.S. Provisional Application 63/515,524, filed Jul. 25, 2023, which is hereby incorporated by reference in its entirety for all purposes.

TECHNICAL FIELD

The present disclosure relates generally to computing technology and, in particular, impact control on electronic accounts, including without limitation, protocol inspection for impact control on resources in electronic accounts.

BACKGROUND

Enterprises, such as corporations or organizations, can utilize applications to provide various services to their clients. Such services can include utilizing computing devices to manage resources on behalf of clients across a variety of electronic client accounts.

SUMMARY

Aspects of technical solutions of this disclosure control event-based impacts across protocols of electronic accounts in applications managing client resource allocation. When an enterprise (e.g., corporation or organization) provides services to other enterprises and manages client resources across various client accounts, the service providing enterprise can utilize a number of applications that can employ different protocols to control allocation and management of resources for various individual accounts. Sometimes, external events can lead to adjustment of client-related information in an account of one application which can impact the protocols and resource allocation on another account of the client in another application. In such instances, it can be challenging to identify all of the impacted electronic accounts across different applications and accurately address the impacts to their protocols. This can result in errors that can mismanage resource allocation, adversely impact client experience, while also costing additional compute and network resources to address. The technical solutions described herein overcome these technical challenges by providing systems and methods that detect events concerning a client electronic account in one application and identify its impact with respect to other client electronic accounts in other applications. The technical solutions can utilize a data structure to adjust the protocol controlling the resource allocation in order to control the impact to the electronic account of the client.

In one aspect, the technical solutions relate to a system. The system can include one or more processors coupled with memory. The one or more processors can be configured to detect, via a threshold set based on historical performance of one or more protocols to control resource allocation of one or more applications, an event of a first electronic account of a client on a first application. The one or more processors can be configured to determine that the event on the first application has an impact on resource allocation controlled by a protocol of a second electronic account of the client on a second application of the one or more applications. The one or more processors can be configured to generate, in response to the detection, a data structure of the first application, the data structure including data corresponding to the client and an instruction to cause an adjustment to the protocol of the second electronic account. The one or more processors can be configured to transmit the data structure to the second application to control the impact via the adjustment to the protocol of the second electronic account implemented using the instruction and the data. The one or more processors can be configured to execute the protocol of the second electronic account to control resource allocation in accordance with the adjustment.

In one aspect, the technical solutions relate to a method. The method can include detecting, one or more processors coupled with memory, via a threshold set based on historical performance of one or more protocols to control resource allocation of one or more applications, an event of a first electronic account of a client on a first application. The method can include determining, by the one or more processors, that the event on the first application has an impact on resource allocation controlled by a protocol of a second electronic account of the client on a second application of the one or more applications. The method can include generating, by the one or more processors, in response to the detection, a data structure of the first application, the data structure including data corresponding to the client and an instruction to cause an adjustment to the protocol of the second electronic account. The method can include transmitting, by the one or more processors, the data structure to the second application to control the impact via the adjustment to the protocol of the second electronic account implemented using the instruction and the data. The method can include executing, by the one or more processors, the protocol of the second electronic account to control resource allocation in accordance with the adjustment.

In one aspect, the technical solutions relate to a non-transitory computer-readable medium comprising instructions that, when executed by one or more processors, cause the one or more processors to detect, via a threshold set based on historical performance of one or more protocols to control resource allocation of one or more applications, an event of a first electronic account of a client on a first application. The instructions, when executed by the one or more processors, can determine that the event on the first application has an impact on resource allocation controlled by a protocol of a second electronic account of the client on a second application of the one or more applications. The instructions, when executed by the one or more processors, can generate, in response to the detection, a data structure of the first application, the data structure including data corresponding to the client and an instruction to cause an adjustment to the protocol of the second electronic account. The instructions, when executed by the one or more processors, can transmit the data structure to the second application to control the impact via the adjustment to the protocol of the second electronic account implemented using the instruction and the data. The instructions, when executed by the one or more processors, can execute the protocol of the second electronic account to control resource allocation in accordance with the adjustment.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION OF ASPECTS OF THE INVENTION

Figure 1:
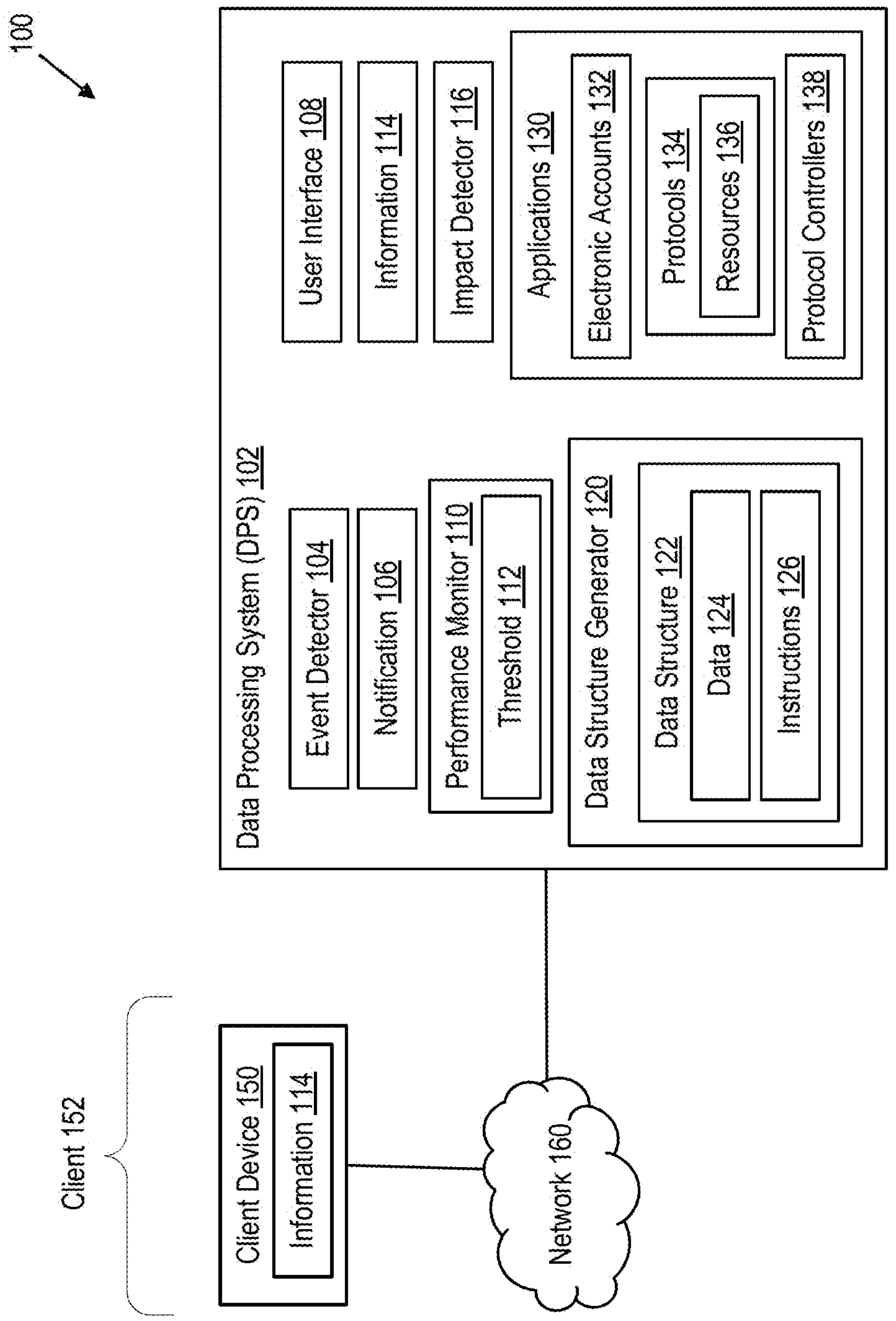
FIG. 1 is an illustrative architecture of an example system for adjustment of a protocol controlling resource distribution on electronic account of an application in response to an impact caused by an event on an electronic account on a different application.

The technical solutions of the present disclosure shall now be described in detail with reference to the drawings, which are provided as illustrative examples of the embodiments so as to enable those skilled in the art to practice the embodiments and alternatives apparent to those skilled in the art. Figures and examples below are not meant to limit the scope of the present embodiments to a single embodiment, but other embodiments are possible by way of interchange of some or all of the described or illustrated elements, or those apparent to a person of ordinary skill in the art. Certain features of the aspects of the solutions can be partially or fully implemented using known components, only those portions of such known components that are necessary for an understanding of the present embodiments shall be described, and detailed descriptions of other portions of such known components will be omitted so as not to obscure the present embodiments. Embodiments described in their illustrated contexts should not be limited thereto. For example, embodiments described as being implemented in software should not be limited to such implementation alone, but they can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

The technical solutions are directed to management of event-based impacts on protocols of electronic accounts within applications managing client resource allocation. In scenarios where a service-providing enterprise is responsible for managing client resources across different electronic accounts, various applications can be employed for allocating and overseeing resource allocation for specific purposes. However, external events can trigger changes in client-related information within one application, consequently affecting the protocols for resource allocation in electronic account of the client in another application. Identifying and addressing such impacts across different applications can be complicated, time consuming, prone to errors, while also being compute and resource intensive. Overcoming such challenges, the technical solutions provide systems and methods to detect an event in a client electronic account within a first application, determine the impact of the event on other client applications, and generate a data structure to cause an adjustment to the protocols of the impacted electronic accounts and its applications for resource allocation with respect to impacted applications. In doing so, the technical solutions reduce the computations and processing utilized to provide the solutions in a more energy efficient manner.

The technical solutions can streamline the handling of event-based impacts on electronic accounts within a complex ecosystem of applications managing client resource allocation. The technical solutions can detect relevant events within a client's electronic account in one application and effectively identify their implications on other applications. This allows for a comprehensive understanding of the impacts across various client accounts. Furthermore, the solutions can employ data structures to facilitate the necessary adjustments to protocols for resource allocation, to make all affected client accounts appropriately managed. By providing a unified approach to addressing event-driven changes across multiple applications, the solutions enhance the efficiency and effectiveness of managing client resources in a dynamically changing environment.

FIG. 1 is an illustrative architecture of an example system 100 for adjustment of a protocol controlling resource distribution on electronic account of an application in response to an impact caused by an event on an electronic account on a different application. Example system 100 can include a client device 150 communicating information 114, via a network 160, with a data processing system (DPS) 102. DPS 102 that can include, provide or execute one or more event detectors 104, notifications 106 and user interfaces 108. DPS 102 can include, provide or execute one or more performance monitors 110 that can include or operate based on one or more thresholds 112. DPS 102 can include, execute or provide one or more information 114, impact detectors 116 and data structure generators 120 that can generate one or more data structures 122 including one or more data 124 and instructions 126. DPS 102 can communicate with, include, execute or provide one or more applications 130 that can service or include one or more electronic accounts 132 in accordance with one or more protocols 134 for allocating resources 136. Applications 130 can include, be coupled with or utilize or more protocol controllers 138, for the protocol controllers facilitate managing, adjusting or controlling protocols 134 of the electronic accounts 132 or applications 130.

In one example, system 100 can include a client device 150 sending information 114 to the DPS 102, via a network 160. DPS 102 can receive, parse and process the information 114, which can include data of a client 152 (e.g., enterprise, corporation or organization). Information 114 can include data corresponding to a first electronic account 132 of a first application 130, such as data or information about one or more employees of the client 152, a change in a status of a client 152 or its employees (e.g., a change in address, state of residence, benefits, position, compensation, or a protocol for controlling resource allocation). Event detector 104 can detect one or more events corresponding to the information 114 based on a threshold 112. The threshold 112 can be determined by a performance monitor 110 using historical performance data (e.g., prior information 114 from one or more clients). Impact detector 116 can detect an impact on allocation of resources 136 by a protocol 134 of one or more applications 130 and/or electronic accounts 132. For instance, impact detector 116 can detect an impact on allocation of resources 136 of a second electronic accounts 132 of a second application 130 that is different from a first electronic account 132 of a first application 130 in connection with which the information 114 was received. To address, adjust or control the impact, data structure generator 120 can generate a data structure 122 that can include data 124 and instructions 126. Data structure 122 can be sent to the impacted second application 130 which can utilize a protocol controller 138 to adjust the protocol 134 of the impacted second electronic account 132 of the second application 130 in order to adjust the control of the resources 136 in accordance with the adjustments to the protocol 134.

As shown in FIG. 1, computing system 100 can include a data processing system (DPS) 102. DPS 102 can include any combination of hardware and software, including functions or procedures to handle and manipulate any data. DPS 102 can execute or implement collection, storage, retrieval, analysis, and transformation of data. to produce meaningful information. DPS 102 can be resident on a network infrastructure, such as within a cloud environment, or on any other network device, such as a separate independent computing device (e.g., a server, a server farm or a third party server or cloud-based service provider). DPS 102 can be distributed across multiple devices and execute one group (e.g., one or more) of applications 130 specialized for one type of service on one device (e.g., server) and another group of applications 130 specialized for another type of service on another device. DPS 102 can include utilize processors (e.g., 620) to execute computations and memory (e.g., 615) or storage devices (e.g., 625) to store or hold data temporarily or permanently.

Client device 150 can include any type and form of a network device that a client 152 (e.g., enterprise, corporation or organization) or its employees or representatives can use to communicate with the DPS 102. Client device 150 can include personal computer, a workstation, a laptop, a smartphone or a tablet. Client device 150 can include applications or functions and user interfaces (e.g., user interface 108) for providing or entering information 114 that can be transmitted or input into various applications (e.g., applications 130) of the DPS 102. Client device 150 can include a standalone device or a cloud-based software as a service application that users (e.g., client employees or representatives) can use to communicate with the DPS 102.

Network 160 can include any one or more types of networks that can be used for communication between a client device 150 and a data processing system 102. This can include Local Area Networks (LANs), typically used within a limited geographical area, such as an office or building, and Wide Area Networks (WANs), which span larger distances and can connect devices across cities or countries. Additionally, Metropolitan Area Networks (MANs) can be utilized to cover a city or metropolitan area. Network 160 can support internet-based connections, using protocols like TCP/IP, and enabling access to cloud-based data processing systems. Network 160 can include or support wireless networks, such as Wi-Fi and cellular networks, as well as Virtual Private Networks (VPNs) which can provide security to public networks. Network 160 can include or utilize Intranets (e.g., private networks within an organization) facilitating internal communications.

Information 114 can include any type and form of information relating a client (e.g., enterprise or a corporation) or one or more employees of the client. Information 114 can include information or data on client's properties, subsidiaries, investments, systems and tools. Information 114 can include information on a state or nature of business, such as a type of industry or work carried out by the client, payroll amount of employees, including for occupations of varying risk level, job roles and classifications within the organization (e.g., risk of injury varying based on job roles), client's prior performance with respect to resource allocation impacts (e.g., prior risks or injuries of employees and their impact on resource allocation on an electronic account), client's performance or industry certifications (e.g., safety or performance certifications), protocols for controlling resource allocation, training programs, and risk management practices for the clients or employees, employee's historical data (e.g., risk or injury history), employee count of the client, geographic location (e.g., state or country) of the client and/or employee, or employee experience (e.g., years of experience of an employee in a particular occupation).

Event detector 104 can include any combination of hardware and software that receives information 114 and identifies or detects events that can affect protocols 134 or allocation of resources 136 in connection with electronic accounts 132 and applications 130. Event detector 104 can identify or detect events based on any information 114, such as information 114 pertaining to a particular electronic account 132, a particular client or a client's employee or entity. Event detector 104 can include a parsing function to parse incoming information 114. Event detector 104 can include the functionality to analyze the received information 114 and identify any number of specific events (e.g., occurrences or actions) that can relate or correspond to any electronic account 132 or applications 130 corresponding to the client (e.g., enterprise, organization or corporation), an employee of the enterprise or an entity of the enterprise (e.g., a subsidiary company, a vehicle, a machine or a system, an asset, such as a building or land, or any other property that the enterprise can own or control). Event detector 104 can detect any type and form of events.

An event detected by event detector 104 can include, for example any action or occurrence that affects, impacts or changes a protocol 134 or a distribution or allocation of resources 136 by a protocol 134. Event can include or be determined based on any information 114. Event can include changes or modifications to client or employee addresses, alterations to their state of residence, adjustments to benefits, position, or compensation, updates to the protocol governing resource allocation for one or more electronic accounts 132 or any other changes to any application 130 or electronic account 132. Event can include a change to a marital status of an employee or number of dependent family members (e.g., dependents of the employee), a change to a status of a client (e.g., enterprise or organization), a change to a beneficiary of an employee or any other information that can change or affect a policy or a rule for a resource allocation. Event can include a change in status (e.g., ownership or lease) of an entity (e.g., property) of the client or an employee.

Notification 106 can include any type and form of notification that DPS 102 can generate or provide internally or externally. A notification 106 can include a message, such as a text message or an email message to a client device 150 or any other device (e.g., device of an employee or application administrator). Notification 106 can include a message or text (e.g., content) on a website or web page. Notification 106 can include an automated message or text informing clients or users of changes made to applications 130. Notification 106 can include a prompt for the user (e.g., client or employee), seeking validation, approval or confirmation that the user can provide responsive to the notification 106, such as an approval or confirmation to proceed with suggested changes to the protocol 134 for a given application. Notification 106 can include an indication that an action was taken by the DPS 102 on an application 130 or with respect to a particular electronic account 132.

User interface 108 can include any type and form of an interactive platform through which users or clients can interact with and utilize functionalities of the DPS 102. User interface 108 can allow users to input data, retrieve processed information, and execute various operations. User interface 108 can include websites, webpages, email clients and applications, text message functionalities, graphical user interface with graphical elements such as menus, buttons, forms, and charts, allowing users to input data, configure settings, and visualize data outputs.

Performance monitor 110 can include any combination of hardware and software for monitoring, tracking and analyzing performance or trends of historical information 114 (e.g., data or performance) with respect to applications 130 and/or electronic accounts 132. Performance monitor 110 can utilize historical data or performance to establishment performance thresholds 112 for event detection. Performance monitor 110 can collects and analyze information 114 related to application 130 or electronic account 132 changes, events or behavior, and gather system metrics relating various electronic account 132 activities over time. By observing and recording the past performance patterns, performance monitor 110 can identify expected or typical performance ranges and can set specific thresholds 112 based on the historical values. Thresholds 112 can act as predefined benchmarks, and when current performance (e.g., indicated by information 114) deviates from these thresholds (e.g., crosses the threshold 112), the performance monitor 110 and/or event detector 104 can trigger event detection. Threshold 112 can be used to determine if an event has an impact that is greater than a threshold (e.g., if a change to the protocol 134 or allocation of resource 136 is greater than a threshold). This proactive approach allows for timely identification of anomalies, performance bottlenecks, or other features of events affecting electronic accounts 132.

Impact detector 116 can include any combination of hardware and software for detecting impacts to an electronic account 132, an application 130, a protocol 134 or a resource 136 allocated, distributed or managed according to a protocol 134. Impact detector 116 can include any functionality for identifying an electronic account 132, an application 130, a protocol 134 or a resource 136 that is impacted by an event detected by an event detector 104. Any combination of event detector 104, performance monitor 110, threshold 112 and impact detector 116 can be combined into a single function for detecting events and determining their impact with respect to any number of applications 130, electronic accounts 132, protocols 134 or distribution of resources 136. Impact detector 116 can utilize thresholds 112 generated by performance monitor 110 to determine if events, described, specified or indicated by information 114, or otherwise derived or determined based on information 114, have an impact or effect that is greater than the threshold 112. Impact detector 116 can process incoming information 114 for a first electronic account 132 and detect an impact to another electronic account 132 based on the information 114. Impact detector 116 can provide information, instruction or commands to data structure generator 120 to generate data structure 122 to address the impact to the identified electronic accounts, applications 130, protocols 134 or resources 136.

Data structure generator (DSG) 120 can include a combination of hardware and software for creating data structures 122 for causing adjustments to protocols 134. DSG 120 can include a systematic way of organizing, arranging and/or storing data 124, enabling efficient manipulation, retrieval, and management of the stored information. DSG 120 can include any data structure that can include both data 124 (e.g., metadata or user data) and instructions 126 (e.g., requests) arranged in a structured format. DSG 120 can include the functionality to generate data structures 122 that can be utilized for storing and transmitting information between different components or systems. DSG 120 can generate the data structure 122, for example, in the form of a JSON object, consisting of key-value pairs representing different attributes and values related to a specific event detected by event detector 104. DSG 120 can be included in or coupled with the event detector 104 and/or impact detector 116 to generate data structures 122 to automatically update applications 130, electronic accounts 132, protocols 134 or distribution or allocation of resources 136. DSG 120 can include the functionality to send the generated data structure 122 to protocol controller 138 to update the protocol 134 of a particular electronic account 132, responsive to the data structure 122.

Data structure 122 can include any organized format or a collection of data and instructions for facilitating updates to protocols 134 of electronic accounts 132 or applications 130. Data structure 122 can include any data structure for restructuring, modifying, adjusting or controlling distribution or allocation of resources 136 implemented by a protocol 134 for an electronic account 132. Data structure 122 can be implemented in any computer language or form, such as a JSON (JavaScript Object Notation) object, which can be used for organizing and representing data in a structured manner. Data structure 122 can include one or more key-value pairs, where each key can include a field name describing a specific attribute, and the corresponding value that can include associated data for the attribute. In this example, the data structure can include information related to a policy update event, including event details such as event category, type, status, date and time, as well as metadata and external data associated with the event. Data structure 122 can allow for easy access, retrieval, and manipulation of data elements, and be used for communication and integration between different components or systems (e.g., applications 130). Data structure 122 can be implemented in a human-readable format and be used in data processing systems, utilizing and interfacing with APIs, and web applications.

Data 124 can include any information in a data structure 122 that can be used by a DPS 102 and/or protocol controller 138 to adjust or control a protocol 134. Data 124 can include data in a data structure 122 implemented as a JSON object. Data 124 can include various types of data, including strings, integers, booleans, dates, null values, objects, arrays, and nested JSON objects. For example, data 124 can include a string of characters for textual information like event categories and usernames, while integers can represent whole numbers for identifiers and counts. Data 124 can include Boolean indicate true or false values for specific attributes. Data 124 can include dates and times, formatted with an event timestamps. Data 124 can include number values (e.g., 1) or null values indicating the presence or absence of data for certain fields. Data 124 can include object group related data with their corresponding keys, and arrays contain lists of values, such as classification summaries.

Instructions 126 can include any type and form of instruction or command causing DPS 102 (e.g., protocol controller 138) to make an adjustment to a protocol 134 of an electronic account 132. For example, within a data structure 122, an instruction 126 can include a "requestData" field, which can include data 124 for a request associated with the event, such as a type of action to be taken, the status of the request, or a user who initiated it. Instructions 126 can provide guidance on how to handle and process a particular action or operation. Instructions 126 can be expressed through various attributes that can include or be coupled with data 124.

For example, instruction 126 can include "requestId," uniquely identifying the request, "requestStatus," indicating the current status of the request (e.g., "Needs Attention"), "launchPoint," specifying the triggering event or purpose of the request (e.g., "ADD_EMPLOYEE"), and "scenario," providing context for the request (e.g., "ADD_STATE_WC"). These instructions 126 and their data 124 can instruct the protocol 134 to perform particular changes to particular aspects of the protocol 134 for a particular electronic account. Instructions 126 can include the "action" attribute instructing the system on what specific action to perform in response to the request (e.g., "Launch"), and "submittedBy" identifies the user who initiated the request (e.g., "Leonie Stewart") with a timestamp ("submittedOn") indicating when the request was submitted. Instructions 126 can allow the DPS 102 (e.g., protocol controller 138) to implement and execute specific requested actions, and process associated data 124 to modify a protocol 134 to manage the resources 136 in accordance with intended process, operations or workflow.

In one example, a data structure 122 can include a set of instructions 126 and data 124 related to a protocol 134 update event (e.g., a policy update event), such as an endorsement for a certain client's protocol 134 corresponding to an insurance policy. Data structure 122 can include different attributes, which can serve as instructions 126 and data 124 for the DPS 102. For instance, "partitionId" can be a unique identifier for organizing the data 124, while "eventCategory" can indicate that this event is a "Policy Update." For example, an attribute "eventType" can specify the type of policy update as an "external.policy.endorsement." An attribute "actorUserName" can represent the user who initiated the event, and "actorDeviceID" can show the device used for this action, which can be identified by its IP address and the internet browser used.

The "eventData" field of the data structure 122 can include specific instructions (instruction 126) and data (data 124). For instance, "requestData" can include information about the specific request, including "requestId" for uniquely identifying the request with its unique identifier and "requestStatus" that can be set to "Needs Attention," signifying the request's current status. Other data (data 124) in "externalData" field can include an address with "address1," "address2," "city," "state," and "zip," along with the "suiState" set to a particular state (e.g., Florida). A "classificationSummaryList" can include information about the policy classification, such as "classCode," "description," "numEmployees," and "estimatedAnnualPayroll." All of the data 124 can help manage and process updates to the protocol 134 (e.g., coverage plan or a policy) for a particular electronic account.

An example of a data structure 122 including data 124 and instructions 126 can include, for example:

```
{"partitionId": "2382736",
  "eventCategory": "Policy Updates",
  "eventType": "external.policy.endorsement",
  "eventTitle": "Endorsement",
  "eventStatusCode": "Processing",
  "recordDatetime": "2021-04-25T21:30:05",
  "originatorAppId": null,
  "originatorEventID": "null",
  "actorAppId": 8,
  "actorUserID": 900000016,
  "actorUserName": "MoniquePantoja",
  "actorDeviceID": "10.116.255.4",
  "actorBrowser": "Chrome",
  "eventDeviceID": "10.116.255.4",
  "eventData": {
    "metaData": {
      "ooid": "G3Q7NCJP483GV14A",
      "sourceSystem": "ISCLIENT",
      "sourceSystemValue": 2854771,
      "adpCorrelationId": "46e0fa34-1ad7-48b0-b3d9-32af79d0bf10",
      "adpMessageId": "46e0fa34-1ad7-48b0-b3d9-32af79d0bf10",
      "adpTransactionId": "46e0fa34-1ad7-48b0-b3d9-32af79d0bf10"
    },
    "externalData": {
      "requestData": {
        "requestId": "END-FL-PC-2854771-RUN-777000715305",
        "requestStatus": "Needs Attention",
        "launchPoint": "ADD_EMPLOYEE",
        "scenario": "ADD_STATE_WC",
        "action": "Launch",
        "submittedBy": "Leonie Stewart",
        "submittedOn": "2023-05-31T10:02:32.279-04:00",
        "updatedBy": null,
        "updatedOn": null,
        "closedReason": null,
        "carrierDeniedReason": null
      },
      "address": {
        "address1": null,
        "address2": null,
        "city": null,
        "state": null,
        "zip": null
      },
      "suiState": "FL",
      "suiEffectiveDate": null,
      "classificationSummaryList": [
        {
          "classCode": "0001",
          "classCodeSuffix": "00",
          "description": "PRIVATE ESTATE INSERVANTS.",
          "numEmployees": 1,
          "estimatedAnnualPayroll": 1000,
          "isDefaultClassCode": true,
          "isAdditionalJobDescription": false
        } ],
      "lossesToDate": false
    } } }
```

Applications 130 can include any combination of hardware and software for providing and implementing various protocols 134 (e.g., coverage plans, coverage arrangements, policies or rules) for clients (e.g., enterprises), regarding their employees' management and welfare. Application 130 can include functionalities for implementing human resource policies, conducting payroll processing, managing worker's compensation, administering health coverage, and facilitating coverage arrangement or a coverage plan employees or enterprise properties like real estate and vehicles. Application 130 can allow users to access, customize, and enforce a wide range of coverage plans or coverage arrangements that govern their workforce and asset protection. Applications 130 can include features to coverage arrangements or plans related to protocols 134 for providing employee benefits, retirement plans, time and attendance tracking, talent management, cybersecurity protocols, and compliance measures, among others.

Electronic accounts 132 can include any account pertaining to a particular client (e.g., enterprise) or a particular employee of the enterprise. Electronic account 132 can include any digital or electronic user profiles or records storing or managing specific instances of protocols 134 for a client or an employee, such as protocols 134 for managing coverage or arrangement for health insurance, worker's compensation, and other services described herein, in relation to individual clients or their employees. Electronic account 132 can include detailed information regarding a coverage or arrangement, its terms, actors, time frames and beneficiaries. For instance, a health insurance electronic account may contain the medical history, coverage limits, and claims records of an individual client or their employees. Similarly, a worker's compensation electronic account could maintain data on workplace injuries and related compensation claims. These electronic accounts facilitate efficient policy administration, enable timely updates, and allow seamless access to critical policy information for clients, employees, and relevant stakeholders, ultimately streamlining policy management and ensuring optimal coverage for all parties involved.

Protocols 134 can include any structured set of rules, guidelines, or procedures designed to govern specific aspects of operations or interactions with respect to resources 136. Protocols 134 can govern distribution or allocation of resources 136 in connection with coverage arrangements or plans in connection with a particular electronic account 132. Protocols 134 can serve as standardized frameworks that dictate how particular activities, processes, or transactions should be conducted. For instance, a protocol 134 can include and outline terms and conditions of coverage, claim processes, and premium calculations for different coverage plans or products. Workers' comp-related protocols 134 can establish the procedures for handling workplace injuries, reporting incidents, and providing compensation to employees. Payroll-related protocols 134 can define the methods for calculating wages, deductions, and tax withholdings for employees.

Protocols 134 can manage or distribute or allocate outflow or disbursement of resources 136 across various time frames, such as daily, weekly, biweekly, monthly, bimonthly, quarterly, semi-annually or annually. Resources 136 can include coinage, currency or assets with respect to value that can be allocated or distributed according to the protocol 134. Protocols 134 can set the value (e.g., amount) of the resources 136 to be disbursed, allocated or distributed, as well as the timing, the amount (e.g., value or fraction) and destination of their allocation, disbursement or distribution.

Protocol controllers 138 can include any combination of hardware and software for controlling, adjusting, managing or modifying protocols 134. Protocol controller 138 can include the functionality to receive a data structure 122 and utilize the data 124 and instruction 126 to update a protocol 134 associated, corresponding to, or identified based on information 114. Protocol controller 138 can adjust or modify the protocol for a particular electronic account 132, responsive to, based on, or according to the data structure 122. Protocol controller 138 can adjust, or cause adjustment to, a resource 136 amount and/or timing, destination or manner of the distribution, allocation or disbursement of the resources 136 according to data structure 122 and its contents.

Protocol controller 138 can modify a protocol 134 pertaining to a coverage or protection plan or agreement (e.g., insurance policy), such as by implementing an endorsement of the protection plan or agreement. The endorsement can pertain to a particular protection plan or agreement corresponding to a particular electronic account 132, such as a health coverage or a plan, a protection coverage or a plan or any other policy for which resources 136 (e.g., value) is provided, distributed or allocated. Protocol controller 138 can implement changes to the protocol 134, causing changes to the plan or coverage corresponding to the electronic account 132, such as to expand or restrict coverage, or increase or decrease resources 136 distributed over a particular time period, for the given plan or coverage.

Figure 2:
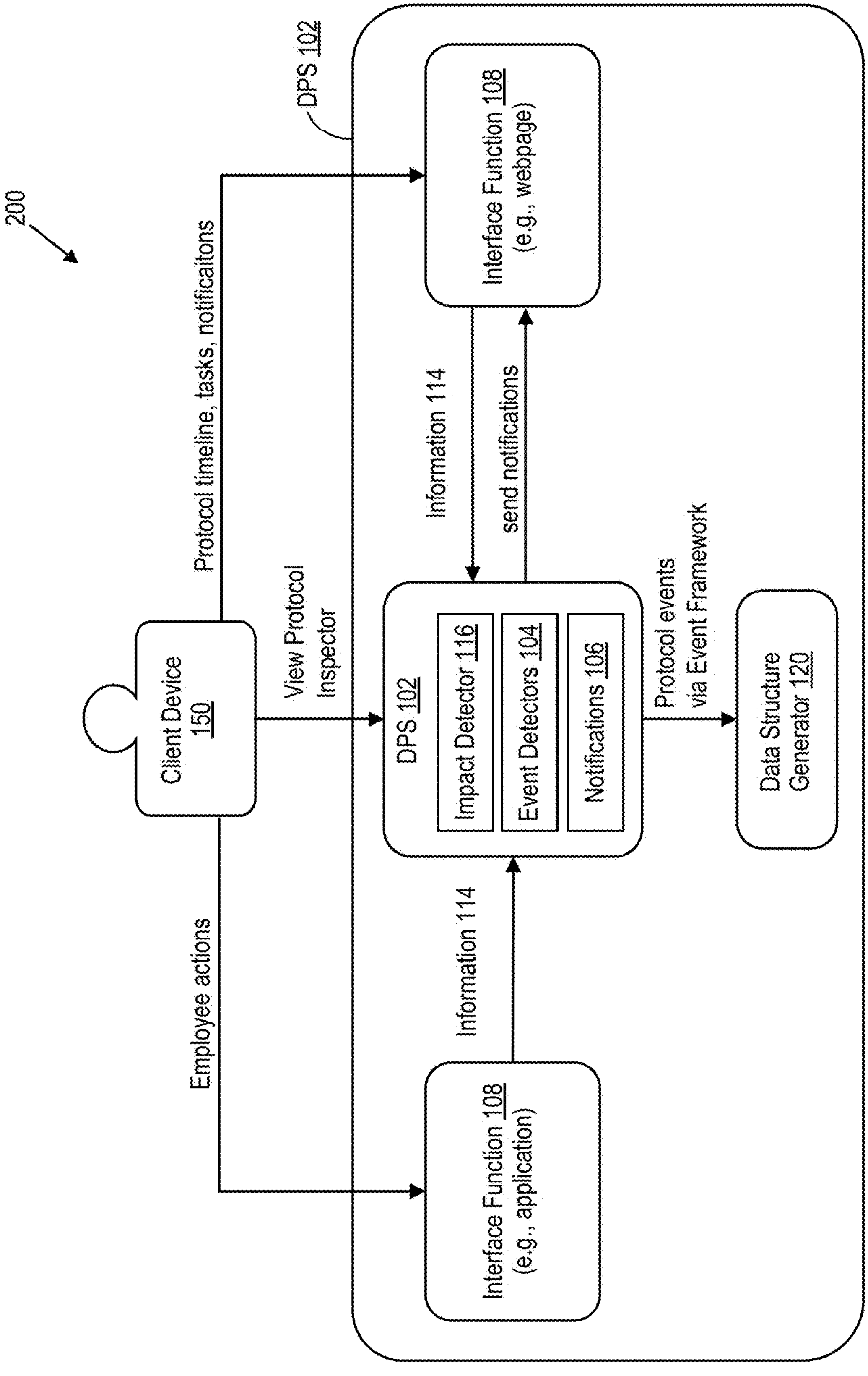
FIG. 2 shows an example of a data processing system for controlling event-based impacts via protocol adjustments on electronic accounts interacting with a user device, in accordance with aspects of the technical solutions.

FIG. 2 shows a block diagram of an example system 200 in which a client device 150 interacting with a DPS 102 for controlling event-based impacts via protocol adjustments on electronic accounts. Example system 200 can include a client device 150 transmitting employee actions to a first interface function 108 of a first application 130. System 200 can also transmit data on protocol timeline, tasks and notifications to another interface function 108, such as via a webpage of another application 130. Both interfaces 108 can send data (e.g., information 114) to the DPS 102, which can include an impact detector 116, an event detector 104 and notifications 106 that can be sent out.

DPS 102 can receive the information 114 and can detect an event with respect to a first electronic account of a first application 130. Impact detector 116 can detect an impact of the event on a second electronic account on a second application 130. The first application can be an application for payroll of employees of a client, while the second application can be an application having a second electronic account that uses a protocol for allocating resources, such as for example a digital online account of a coverage agreement or a protection plan or policy. The first and second electronic accounts can be related or associated, such as correspond to the same client (e.g., enterprise) or the same one or more employees.

Prior to implementing the change to the protocol of the second electronic account, DPS 102 can send one or more notifications, via interface function 108 (e.g., webpage) to the client or end user (e.g., employee or administrator), prompting the client or the end user whether protocol adjustment is approved. In response to receiving an approval from the client and/or the end user to proceed with the adjustment to the protocol, DPS 102 can send a request or instruction to DSG 120 to generate a data structure. DSG 120 can generate data structure 122 having data 124 generated based on the information 114 and one or more instructions 126 (e.g., requests) to cause a change in the protocol of the second electronic account on the second application 130 in order to address the impact of the event at the first electronic account of the first application.

Figure 3:
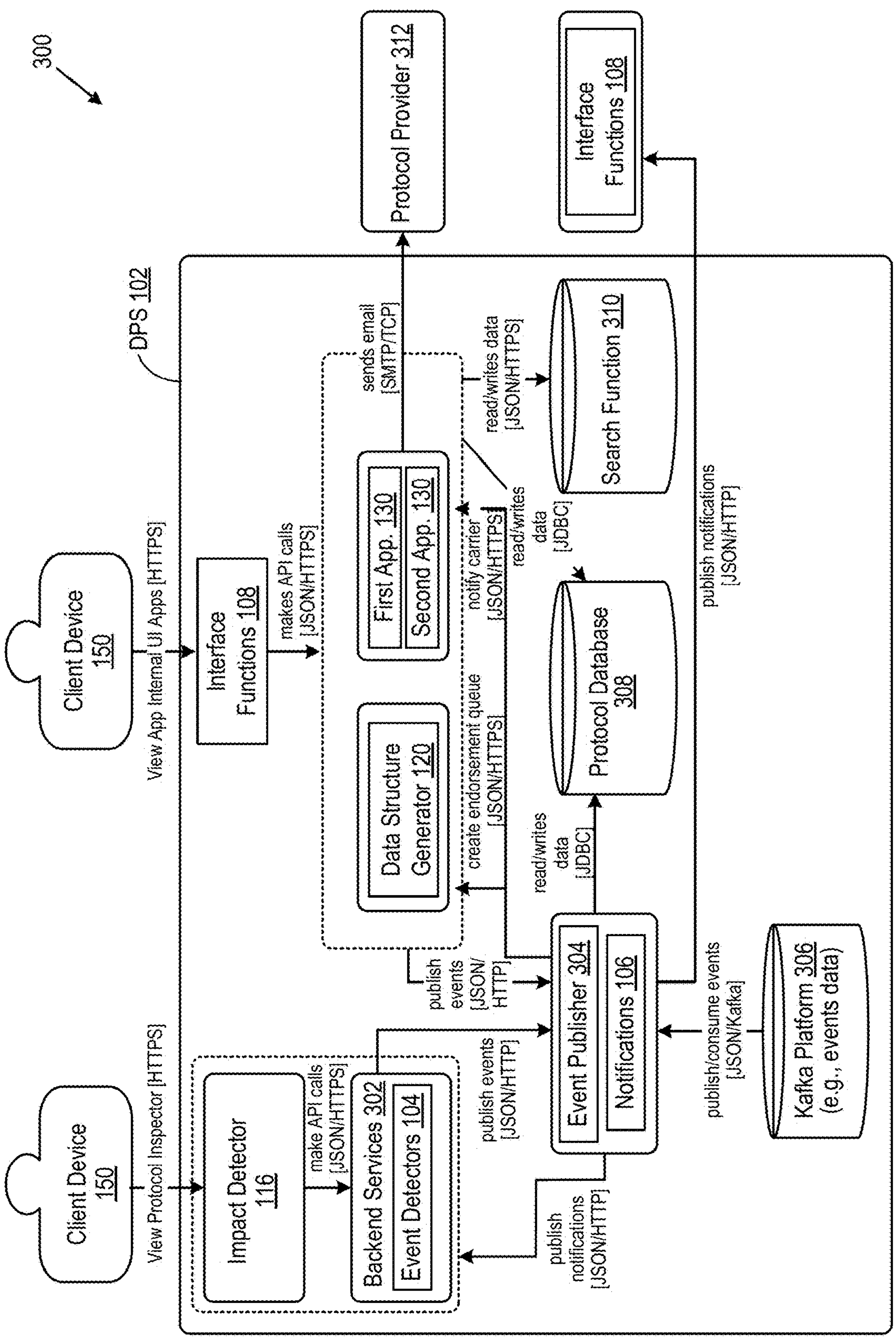
FIG. 3 shows an example of a data processing system for controlling event-based impacts via protocol adjustments on electronic accounts across different applications interacting with external devices and providers, in accordance with aspects of the technical solutions.

FIG. 3 shows a block diagram of an example system 300 in which a DPS 102 controls event-based impacts via protocol adjustments on electronic accounts across different applications interacting with external devices and providers. Example system 300 can include a DPS 102 communicating with multiple client devices 150 (e.g., devices of an enterprise having its accounts serviced by DPS 102, devices of a person, such as an employee, or an administrator controlling services provided to the enterprise). DPS 102, which can be referred to as a protocol inspector or protocol inspection system, can include an impact detector 116, backend services 302 with event detectors 104, data structure generator 120, interface functions 108, first application 130 and a second application 130, event publisher 304 with notifications 106, kafka platform 306, protocol database 308 (e.g., which can include protocol data) and search function 310 (e.g., which can include timeline data). DPS 102 can communicate with external protocol providers 312 and interface functions 108.

A client device 150 can request to view protocol inspector (e.g., DPS 102) via a request, such as an HTTP request or an HTTPS request. Impact detector 116 can make API calls (e.g., via JSON or HTTPS code) to backend services 302. Backend services 302 can include any combination of event detectors 104 and impact detectors 116 for detecting events and identifying electronic accounts 132 impacted by the events. Backend services can publish events to the DPS 102 components using JSON or HTTP code to the event publisher 304.

Event publisher 304 can receive identified events from the backend services 302 and can publish notifications 106 using JSON and HTTP code. Kafka platform 306 can include a database for storing events data (e.g., other events) and can provide (e.g., publish) events to the event publisher 304, which can notify other components (e.g., backend services 302 and interface functions 108) of the events via published notifications 106. Notifications 106 can include prompts for external users (e.g., client, administrator or user/employee) to seek an approval to proceed with the change or adjustment to the protocol in view of the detected event and/or detected impact. DPS 102 can receive approvals, responsive to the prompts on the interface functions 108, and proceed with causing adjustments to the protocols 134 as a result.

A second client device 150, such as an administrator overseeing the applications and protocols 134 for a variety of electronic accounts 132 (e.g., policies) or an employee of the client, can view the data in the applications 130 via an interface 108. Responsive to inputs or changes made by the second client device 150, interface function 108 can generate API calls (e.g., via JSON or HTTPS) to the DSG 120 and the applications 130 (e.g., first application and the second application).

Responsive to the published events and determined impacts, data structure generator 120 can create an endorsement queue, maintaining the order of the protocols 134 to adjust, responsive to the detected events and impacts. Endorsement queue can be a queue of all different coverage plans or agreements for specific electronic accounts 132 that are going to have their protocols adjusted. DSG 120 can generate the data structure 122 according to the information 114 received. Generated data structure 122 can include data 124 and instructions 126 for causing the change to a particular protocol 134 for a particular electronic account 132. DSG 120 can generate a plurality data structures 122 for a plurality of applications 130 (e.g., first application 130 and the second application 130), each of which can have their electronic accounts 132 adjusted. In order to generate a data structure 122, DSG 120 can read and write data to the protocol database 308 and use a search function 310 to search for timeline data.

Responsive to receiving data structure 122, each application 130 can send a message or an email (e.g., via SMTP or TCP protocols) to the external protocol provider 312. The protocol provider 312 can include an enterprise providing the coverage plan or agreement for which the electronic account 132 is being adjusted. The message or the email can include the data structure 122 or information from the data structure 122 indicating that an adjustment is being made to a particular identified protocol 134 of a particular electronic account 132. DPS 102 can receive from the protocol provider 312, a response message or an email, indicating that the change to the protocol 134 has been implemented.

In an example, a system, such as example systems 100, 200 or 300, can include a DPS 102 comprising one or more processors (e.g., 610) coupled with memory (e.g., 615). DPS 102 can be configured, via processors 610 and/or the memory 615 storing instructions and data to implement a variety of functionalities or tasks discussed herein. DPS 102 can be configured to detect an event of a first electronic account 132 of a client on a first application 130. DPS 102 can be configured to detect the event via a threshold 112 set based on historical performance determined by a performance monitor 110 of one or more protocols 134 to control resource 136 allocation of one or more applications 130.

DPS 102 can be configured to determine that the event on the first application 130 has an impact on resource 136 allocation controlled by a protocol 134 of a second electronic account 132 of the client on a second application 130 of the one or more applications 130. DPS 102 can be configured to determine that the event corresponding to a first electronic account 132 on a first application 130 has an impact on allocation of a resource 136 that is controlled by protocol 134 of the second electronic account 132 of the second application 130. For example, DPS 102 can determine that the event has the impact responsive to a threshold for an amount or value of resources 136 that are being affected, adjusted, added to, or subtracted from the impacted second electronic account 132 responsive to the impact. For example, an impact detector can determine that the amount or value of resources 136 begin affected exceeds a threshold and in response to this determination, the impact detector can detect an impact to the second electronic account 132.

DPS 102 can be configured to generate, in response to the detection, a data structure 122 of the first application 130. The data structure 122 can include data 124 corresponding to the client and/or employee of the client and an instruction 126 to cause an adjustment to the protocol of the second electronic account. The data can correspond to any information of the client and/or employee, such as identifier of a client or an employee, identifier of a requestor, identifier of type of action to take on the protocol 134 or electronic account 132, identifier of the electronic account 132 and/or application 130. Instruction 126 can include a request to implement an action, such as a change to the electronic account 132 and/or protocol 134 controlling resource distribution for the electronic account.

DPS 102 can be configured to transmit the data structure 122 to the second application 130 to control the impact via the adjustment to the protocol 134 of the second electronic account 132 implemented using the instruction 126 and the data 124. For example, protocol controller 138 can make adjustments to the protocol 134 and/or electronic account 132 responsive to the data 124 and instructions 126 of the data structure 122. DPS can be configured to execute the protocol 134 of the second electronic account 132 to control resource 136 allocation in accordance with the adjustment.

DPS 102 can be configured to provide a notification 106 to the client device 150. The notification 106 can be indicative of the controlled impact and the adjustment to the protocol 134 of the second electronic account. The notification 106 can include a message or an email to the client device 150. The notification can include a message or an email to the external protocol provider 312. For example, the event detected by the event detector 104 can include a change of a status of an employee of the client and the threshold 112 can corresponds to an amount of resource 136 allocated.

DPS 102 can be configured to provide for display (e.g., 635) via a user interface 108 a prompt for an authorization to perform the adjustment to the protocol 134 of the second electronic account 132. DPS 102 can receive the authorization via the prompt and execute the protocol 134 of the second electronic account 132 responsive to the authorization. DPS 102 can be configured to trigger the execution of the protocol 134 of the second electronic account 132 based on the detection of the event. For example, DPS 102 can be configured to modify the second electronic account 132 and/or its protocol, based on or responsive to the detection of the event and/or the impact.

DPS 102 can be configured to identify that the first electronic account 132 and the second electronic account 132 correspond to an employee of the client. DPS 102 can be configured to determine, responsive to the identification, that the event has the impact on the resource 136 allocation controlled by the protocol 134 of the second electronic account 132. Instruction 126 can include a request to adjust the protocol 134 of the second electronic account 132 and the data structure 122 indicates at least one of: a type of the event, a time of the event and an information of an employee associated with the second electronic account 132.

DPS 102 can be configured to transmit the data structure 122 to the second application 130 responsive to an application programming interface (API) call from the first application 130 indicating the event. DPS 102 can be configured to allocate, based on the adjustment to the protocol 134 of the second electronic account 132, a resource 136 of the second electronic account 132 over a plurality of time intervals. For example, the resource 136 can be allocated or distributed over the course of one or more days, weeks, months or years. DPS 102 can be configured to utilize, during a first time interval of the plurality of time intervals, a portion of the resource 136 of the second electronic account 132 according to the allocation.

In one example, the example system can correspond to a non-transitory computer-readable medium comprising instructions that, when executed by one or more processors (e.g., 610), cause the one or more processors (e.g., 610) to detect an event. The instructions can cause the one or more processors 610 to detect the event, via a threshold set based on historical performance of one or more protocols to control resource allocation of one or more applications. The instructions can cause the one or more processors 610 to detect the event of a first electronic account of a client on a first application.

The instructions can cause the one or more processors 610 to determine that the event on the first application has an impact on resource 136 allocation controlled by a protocol 134 of a second electronic account 132 of the client on a second application 130 of the one or more applications 130. The instructions 126 can cause the one or more processors 610 to generate the data structure 122. The data structure can be generated in response to the detection. The data structure 122 can include data 124 corresponding to the client and an instruction 126 to cause an adjustment to the protocol 134 of the second electronic account 132.

The instructions can cause the one or more processors 610 to transmit the data structure to the second application to control the impact via the adjustment to the protocol of the second electronic account implemented using the instruction and the data. The instructions can cause the one or more processors 610 to execute the protocol of the second electronic account to control resource allocation in accordance with the adjustment. The instructions can cause the one or more processors 610 to provide, to the client, a notification of the controlled impact and the adjustment to the protocol of the second electronic account.

Figure 4:
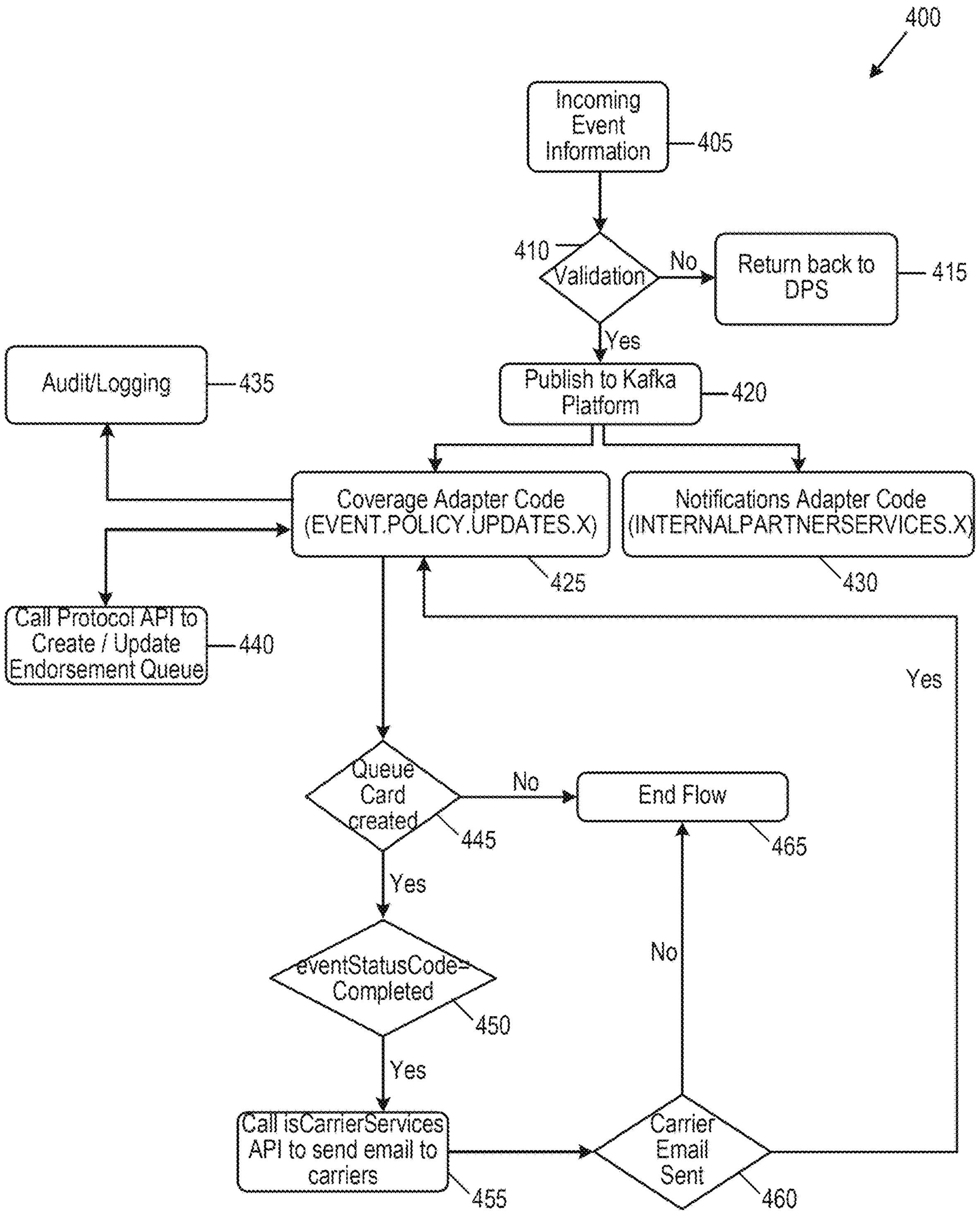
FIG. 4 shows an example process flow for controlling event-based impacts via protocol adjustment on electronic accounts interacting with external devices and providers, in accordance with aspects of the technical solutions.

FIG. 4 shows an example process flow of a method 400 for controlling event-based impacts via protocol adjustment on electronic accounts interacting with external devices and providers, in accordance with embodiments of the technical solutions. Method 400 can be implemented using the system tools, devices and components discussed herein, including for example in FIGS. 1-3. Method 400 can include ACTS 405-465. At ACT 405, an incoming event information can be received. At ACT 410, a validation can be performed. At ACT 415, if the event is not validated, it can be returned back to the DPS (e.g., protocol inspector). At ACT 420, if the event is validated, it can be sent to Kafka platform to be published. At ACT 425, coverage adapter code can be used. At ACT 430, notifications adapted code can be used. At ACT 435, an audit and logging can be performed. At ACT 440, a call protocol API to create or update endorsement queue can be performed. At ACT 445, a determination can be made as to whether a queue card is created. At ACT 450, if a queue card is created an event status code can be completed. At ACT 455, an API call to send email to carriers can be generated. At ACT 460, a carrier email can be sent. At ACT 465, the flow of the method 400 can end.

At 405, an incoming event information can be received. For example, information can be received by a DPS concerning a particular electronic account. The electronic account can correspond to a client or an employee in connection with a particular coverage agreement or a plan maintained by an application using a protocol to distribute or allocate resources (e.g., value) over one or more time intervals.

At 410, a validation can be performed. Validation can be performed by an event detector which can determine if the incoming information corresponds to an event, or some unrelated data. The event detector can determine the information corresponds to the event based on comparing the incoming information with the event. For example, the event detector can compare values, fields, text, characters, keywords or other features of the information with the corresponding information of the event to determine a match or similarity. In some cases, the event detector can determine validity of the event using pattern detection (e.g., a regular expression, or a predetermined template). Thus, the system can trigger execution of the protocol of the second electronic account responsive to validating the event.

At 415, if the event is not validated, it can be returned back to the DPS (e.g., protocol inspector). For example, an event detector can determine that no event exists in the incoming information and a response can be sent back to the DSP indicating no action to be taken.

At 420, if the event is validated, it can be sent to Kafka platform to be published. For example, an event detector can detect an event and an impact detector can detect an impact to an electronic account.

At 425, coverage adapter code can be used. Responsive to the validation at 420, a request (e.g., an API call) can be sent to the Kafka platform and its corresponding database to store information about the event and/or the impact. The request can reference a coverage plan or agreement whose protocol is to be modified. The request (e.g., API call) can be directed to Kafka platform, which can the publish the notifications to the event publisher and other parts of the DPS to trigger data structure generation.

At 430, notifications adapted code can be used. Responsive to the validation at 420, a request (e.g., an API call) can be sent to send out notifications that the event has been detected. The notifications can be used to trigger the data structure generation.

At 435, an audit and logging can be performed. For example, a username and password can be entered by the user (e.g., client, administrator or employee) granting access to the application and/or the electronic account for which to update the protocol.

At 440, a call protocol API to create or update endorsement queue can be performed. Responsive to the logging at 435, an API can be created and sent to the data structure generator to generate the data structure based on the detected event and the related information. The API call can be generated responsive to the call at 425, which can be responsive to the validation at 410, which can be implemented in response to the incoming event information at 405.

At 445, a determination can be made as to whether a queue card is created.

Responsive to the call at 425, queue card can be created. DPS can determine whether there are endorsements (e.g., updates to coverage agreements or plans to implement via changes to protocols) to be implemented. Queue card can be generated, implemented or updated in response to the data structure generator generating the data structure for updating the protocol of the impacted electronic account.

At 450, if a queue card is created an event status code can be completed. Responsive to determining that the queue card is created, updated or generated, a status indicative of the data structure being created can be set to complete. For example, the status indicative of the data structure being received and about to be implemented pending approval from a user can be received, triggering the event status code to be set to complete. For example, the status indicative that the protocol update has been implemented using the data structure can cause the event status code to be set to complete.

At 455, an API call (e.g., isCarrierServices API call) to send email to carriers can be generated. For example, an API call can be generated to send an email or a message to external providers providing the coverage or plan per protocol.

At 460, a carrier email can be sent. Responsive to the API call, the DPS can send the email or the text to the external carrier of the coverage or the plan. The email can indicate to the external provider that the protocol pertaining to coverage has been changed.

At 465, the flow of the method 400 can end. At this point, the method 400 can be completed for the given event and impact. Method 400 can then be similarly repeated for other events causing impact to the same or other electronic accounts or policies.

Figure 5:
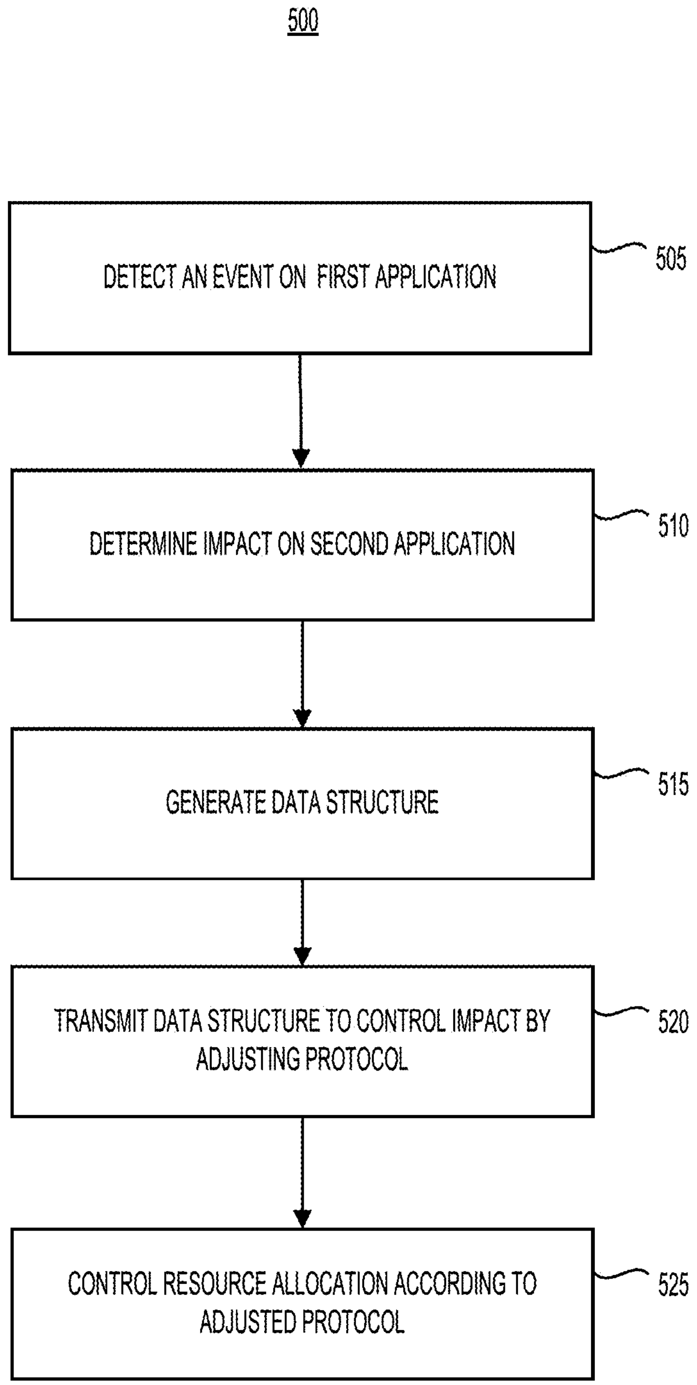
FIG. 5 shows another example process flow for controlling event-based impacts via protocol adjustments on electronic accounts, in accordance with aspects of the technical solutions.

FIG. 5 shows another example process flow of method 500 for controlling event-based impacts via protocol adjustments on electronic accounts, in accordance with embodiments of the technical solutions. Method 500 can be implemented using the system tools, devices and components discussed herein, including for example in FIGS. 1-3. Method 500 can include ACTS 505-565. At ACT 505, an event can be detected on a first application. At ACT 510, an impact can be determined on a second application. At ACT 515, a data structure can be generated. At ACT 520, the data structure can be transmitted to control impact by adjusting a protocol. At ACT 525, resource allocation can be controlled according to adjusted protocol.

At ACT 505, an event can be detected on a first application. The method can include one or more processors coupled with memory detecting, via a threshold set based on historical performance of one or more protocols to control resource allocation of one or more applications, an event of a first electronic account of a client on a first application. The threshold can correspond to a value, amount or number of resources that the event affects. The threshold can correspond to an amount of resource allocated.by an application or an electronic account corresponding to the client or the employee. The threshold can be based on an amount of resource saved by a protocol of an electronic account, such as an amount of value of a resource provided for a coverage agreement or a plan.

The event can include a change of a status of an employee of the client, or the change with respect to the client (e.g., enterprise, corporation or organization). The event can include, for example, a change of home address of the employee, a change of address of the client, a change of employment position or job of the employee, a change in personal status of the employee (e.g., single, married or having a child), or any other change with respect to information of an employee or a client (e.g., enterprise).

The application can be an application for controlling, monitoring, managing or adjusting electronic accounts corresponding to clients and/or employees of the client. The application can correspond to an application for controlling, monitoring, managing or adjusting coverage plans or agreements for clients or employees, such as coverage plans for health events, coverage plans for property (e.g., real estate or vehicles), coverage plans for worker's compensation or any other type of coverage or plans.

At ACT 510, an impact can be determined on a second application. The method can include the one or more processors determining that the event on the first application has an impact on resource allocation controlled by a protocol of a second electronic account of the client on a second application of the one or more applications. Impact detector can determine that there is an impact greater than a predetermined threshold, such as a threshold corresponding to an amount or number of resources affected responsive to the event.

The one or more processors can identify that the first electronic account and the second electronic account correspond to an employee of the client, or to the client (e.g., enterprise or corporation). The one or more processors can determine, responsive to the identification, that the event has the impact on the resource allocation controlled by the protocol of the second electronic account. For example, impact detector can identify all of the electronic accounts corresponding to the employee or the client to which the incoming information identifying the event pertains or relates. For example, information used to detect the event can correspond to a particular employee.

In response to detecting the event, the one or more processors can identify all of the electronic accounts across all of the applications and all protocols for any range of coverage plans that correspond to the particular employee. The one or more processors can, responsive to detection, identify all of the electronic accounts for which the allocation of resources exceeds a predetermined threshold, such as a threshold corresponding to the amount or number of resources changed or affected by the event.

At ACT 515, a data structure can be generated. The method can include the one or more processors generating, in response to the detection, a data structure of the first application. The data structure can include data corresponding to the client and an instruction to cause an adjustment to the protocol of the second electronic account. The data structure generator can generate the data structure responsive to the detection of the event. The data structure generator can generate the data structure responsive to the detection of the impact exceeding a predetermined threshold.

The data structure can include an organized form or arrangement of one or more data, metadata and/or instructions (e.g., requests) for causing a protocol of a particular electronic account to be adjusted. The data structure can include data identifying any one or more of: the electronic account, the client, the employee, the application, the action to be taken with respect to the electronic account or its protocol or a timestamp identifying the date of the data structure or the request for the change to be made. The data structure can indicate at least one of: a type of the event, a time of the event and an information of an employee associated with the second electronic account.

The instruction of the data structure can include a request to adjust the protocol of the second electronic account. The instruction can include, for example, a request to modify a protocol of a coverage plan or an agreement (e.g., an endorsement) to be implemented with respect to a policy of an external protocol provider. The instruction can include one or more requests identifying a change of the coverage plan or agreement with respect to a particular electronic account.

At ACT 520, the data structure can be transmitted to control impact by adjusting a protocol. The method can include the one or more processors transmitting the data structure to the second application to control the impact via the adjustment to the protocol of the second electronic account implemented using the instruction and the data. The data structure can be transmitted to the protocol controller to implement the change to the protocol of the electronic account identified as impacted in accordance with the data and instructions in the data structure.

The data structure can include instructions and data (e.g., metadata, identifiers and information) informing the protocol controller of the adjustments to be made to the protocol. Data structure can be transmitted responsive to an authorization by the client, employee or the user received by the data processing system via a prompt on a user interface. The authorization can authorize the data processing system to complete the adjustment to the protocol and/or the electronic account.

The method can include transmitting the data structure to the second application responsive to an application programming interface (API) call from the first application indicating the event. For example, an event detector can transmit an API call to trigger adjustment to the protocol of the electronic account. Responsive to the API call, the data structure generator can generate the data structure from the received information identifying or indicating the event and transmit the generated data structure to the protocol controller to complete the protocol adjustment or change.

At ACT 525, resource allocation can be controlled according to adjusted protocol. The method can include the one or more processors executing the protocol of the second electronic account to control resource allocation in accordance with the adjustment. The one or more processors can provide, to the client, the employee or the administrator overseeing the protocol adjustment, a notification of the controlled impact and the adjustment to the protocol of the second electronic account. For example, the data processing system can send an email or a message to an external protocol provider of the coverage plan of the electronic account to indicate to the protocol provider that an adjustment to the protocol and/or electronic account has been made.

The one or more processors can provide for display a prompt for an authorization to perform the adjustment to the protocol of the second electronic account. The one or more processors can receive the authorization via the prompt and execute the protocol of the second electronic account responsive to the authorization. For example, the protocol controller can adjust the protocol in accordance with the data structure (e.g., data and the instructions of the data structure) responsive to the authorization received via the prompt to the client (e.g., client, employee or the administrator) received via the user interface.

The one or more processors can trigger the execution of the protocol of the second electronic account based on the detection of the event. The one or more processors can allocate, based on the adjustment to the protocol of the second electronic account, a resource of the second electronic account over a plurality of time intervals. The one or more processors can utilize during a first time interval of the plurality of time intervals, a portion of the resource of the second electronic account according to the allocation.

Figure 6:
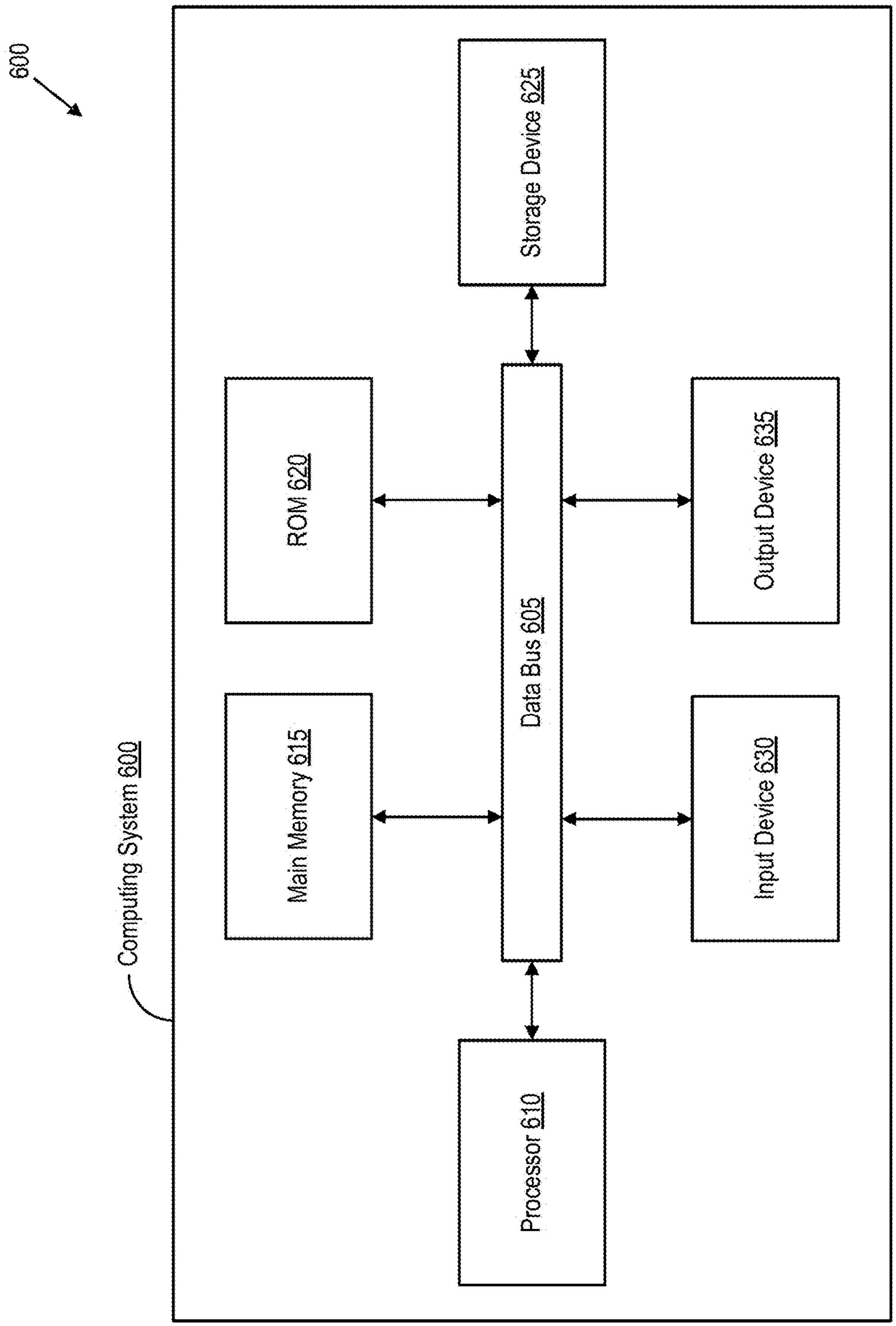
FIG. 6 illustrates a block diagram of a computing system for implementing the embodiments of the present solution, including, for example, the example systems or features depicted in FIGS. 1-5, in accordance with aspects of the technical solutions.

FIG. 6 illustrates a block diagram of a computing system for implementing the embodiments of the technical solutions, in accordance with embodiments. FIG. 6 illustrates a block diagram of an example computing system 600, which can also be referred to as the computer system 600. Computing system 600 can be used to implement elements of the systems and methods described and illustrated herein, such as for example, commands, instructions or data described herein. Computing system 600 can be included in and run any device (e.g., a client device 150, a DPS 102, data structure generator 120, applications 130 and any other components of the system 100).

Computing system 600 can include at least one bus data bus 605 or other communication device, structure or component for communicating information or data. Computing system 600 can include at least one processor 610 or processing circuit coupled to the data bus 605 for executing instructions or processing data or information. Computing system 600 can include one or more processors 610 or processing circuits coupled to the data bus 605 for exchanging or processing data or information along with other computing systems 600. Computing system 600 can include one or more main memories 615, such as a random access memory (RAM), dynamic RAM (DRAM), cache memory or other dynamic storage device, which can be coupled to the data bus 605 for storing information, data and instructions to be executed by the processor(s) 610. Main memory 615 can be used for storing information (e.g., data, computer code, commands or instructions) during execution of instructions by the processor(s) 610.

Computing system 600 can include one or more read only memories (ROMs) 620 or other static storage device 625 coupled to the bus 605 for storing static information and instructions for the processor(s) 610. Storage devices 625 can include any storage device, such as a solid state device, magnetic disk or optical disk, which can be coupled to the data bus 605 to persistently store information and instructions.

Computing system 600 may be coupled via the data bus 605 to one or more output devices 635, such as speakers or displays (e.g., liquid crystal display or active matrix display) for displaying or providing information to a user. Input devices 630, such as keyboards, touch screens or voice interfaces, can be coupled to the data bus 605 for communicating information and commands to the processor(s) 610. Input device 630 can include, for example, a touch screen display (e.g., output device 635). Input device 630 can include a cursor control, such as a mouse, a trackball, or cursor direction keys, for communicating direction information and command selections to the processor(s) 610 for controlling cursor movement on a display.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors 610 in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A system, comprising:

one or more processors coupled with memory, wherein the one or more processors are configured to:

detect, using a threshold set based on historical performance of one or more protocols to control resource allocation of one or more applications, an event of a first electronic account of a client on a first application;

determine that the event on the first application has an impact on resource allocation controlled by a protocol of a second electronic account of the client on a second application of the one or more applications;

generate, in response to the detection, a data structure, the data structure including data corresponding to the client and an instruction to cause an adjustment to the protocol of the second electronic account;

transmit, responsive to an application programming interface (API) call from the first application indicating the event, the data structure to the second application to control the impact via the adjustment to the protocol of the second electronic account implemented using the instruction and the data; and execute the protocol of the second electronic account to control resource allocation in accordance with the adjustment.

2. The system of claim 1, wherein the one or more processors are further data processing system is configured to:

provide, to the client, a notification of the controlled impact and the adjustment to the protocol of the second electronic account.

3. The system of claim 1, wherein the one or more processors are further data processing system is configured to:

provide for display a prompt for an authorization to perform the adjustment to the protocol of the second electronic account;

receive the authorization via the prompt; and execute the protocol of the second electronic account responsive to the authorization.

4. The system of claim 1, where in wherein the one or more processors are further data processing system is configured to:

trigger the execution of the protocol of the second electronic account based on the detection of the event.

5. The system of claim 1, wherein the event includes a change of a status of an employee of the client and the threshold corresponds to an amount of resource allocated.

6. The system of claim 1, wherein the one or more processors are further data processing system is configured to:

identify that the first electronic account and the second electronic account correspond to an employee of the client; and determine, responsive to the identification, that the event has the impact on the resource allocation controlled by the protocol of the second electronic account.

7. The system of claim 1, wherein the instruction includes a request to adjust the protocol of the second electronic account and the data structure indicates at least one of: a type of the event, a time of the event and an information of an employee associated with the second electronic account.

8. The system of claim 1, wherein the one or more processors are further data processing system is configured to:

allocate, based on the adjustment to the protocol of the second electronic account, a resource of the second electronic account over a plurality of time intervals; and utilize, during a first time interval of the plurality of time intervals, a portion of the resource of the second electronic account according to the allocation.

9. A method, comprising:

detecting, by one or more processors coupled with memory, via a threshold set based on historical performance of one or more protocols to control resource allocation of one or more applications, an event of a first electronic account on a first application;

determining, by the one or more processors, that the event on the first application has an impact on resource allocation controlled by a protocol of a second electronic account on a second application of the one or more applications;

generating, by the one or more processors, a data structure corresponding to the first application, the data structure comprising data corresponding to the first electronic account and an instruction to cause an adjustment to the protocol of the second electronic account;

transmitting, by the one or more processors, responsive to an application programming interface (API) call from the first application indicating the event, the data structure to the second application to control the impact via the adjustment to the protocol of the second electronic account implemented using the instruction and the data; and executing, by the one or more processors, the protocol of the second electronic account to control resource allocation in accordance with the adjustment.

10. The method of claim 9, comprising:

providing, by the one or more processors, a notification of the controlled impact and the adjustment to the protocol of the second electronic account.

11. The method of claim 9, comprising:

receiving, by the one or more processors, authorization to perform the adjustment to the protocol of the second electronic account via a prompt; and executing, by the one or more processors, the protocol of the second electronic account responsive to the authorization.

12. The method of claim 9, comprising:

validating, by the one or more processors, the event; and triggering, by the one or more processors, the execution of the protocol of the second electronic account responsive to validating the event.

13. The method of claim 9, wherein the first electronic account and the second electronic account are associated with a client, the client comprising a plurality of employees, and wherein the event comprises a change of a status of an employee of the client and the threshold corresponds to an amount of resource allocated.

14. The method of claim 9, wherein the first electronic account and the second electronic account are associated with a client, the client comprising a plurality of employees, and wherein the method further comprising:

identifying, by the one or more processors, that the first electronic account and the second electronic account both correspond to a same employee of the client; and determining, by the one or more processors, responsive to the identification, that the event has the impact on the resource allocation controlled by the protocol of the second electronic account.

15. The method of claim 9, wherein the instruction comprises a request to adjust the protocol of the second electronic account and the data structure indicates at least one of: a type of the event, a time of the event and an information of an employee associated with the second electronic account.

16. The method of claim 9, comprising:

allocating, by the one or more processors based on the adjustment to the protocol of the second electronic account, a resource of the second electronic account over a plurality of time intervals; and utilizing, by the one or more processors, during a first time interval of the plurality of time intervals, a portion of the resource of the second electronic account according to the allocation.

17. A non-transitory computer-readable medium comprising instructions that, when executed by one or more processors, cause the one or more processors to:

detect, via a threshold set based on historical performance of one or more protocols to control resource allocation of one or more applications, an event of a first electronic account of a client on a first application;

determine that the event on the first application has an impact on resource allocation controlled by a protocol of a second electronic account of the client on a second application of the one or more applications;

generate, in response to the detection, a data structure of the first application, the data structure including data corresponding to the client and an instruction to cause an adjustment to the protocol of the second electronic account;

transmit, responsive to an application programming interface (API) call from the first application indicating the event, the data structure to the second application to control the impact via the adjustment to the protocol of the second electronic account implemented using the instruction and the data; and execute the protocol of the second electronic account to control resource allocation in accordance with the adjustment.

18. The non-transitory computer-readable medium of claim 17, wherein the instructions, when executed by one or more processors, cause the one or more processors to:

provide, to the client, a notification of the controlled impact and the adjustment to the protocol of the second electronic account.

* * * * *